United States Patent
Wang et al.

(10) Patent No.: US 9,566,985 B2
(45) Date of Patent: Feb. 14, 2017

(54) METHOD AND APPARATUS FOR MONITORING A RESOLVER IN A TORQUE MACHINE

(75) Inventors: Wei D. Wang, Troy, MI (US); Bon Ho Bae, Torrance, CA (US); Leah Dunbar, Manhattan Beach, CA (US); Kevin P. Houle, Flint, MI (US); William R. Cawthorne, Milford, MI (US); Andrew M. Zettel, Ann Arbor, MI (US); Hanne Buur, Brighton, MI (US); Steven E. Schulz, Torrance, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 1307 days.

(21) Appl. No.: 13/022,854

(22) Filed: Feb. 8, 2011

(65) Prior Publication Data

US 2012/0203405 A1  Aug. 9, 2012

(51) Int. Cl.
| | | |
|---|---|---|
| *B60W 20/00* | (2016.01) | |
| *B60W 50/038* | (2012.01) | |
| *B60W 50/02* | (2012.01) | |
| *B60L 3/00* | (2006.01) | |

(52) U.S. Cl.
CPC ........... *B60W 50/038* (2013.01); *B60L 3/0038* (2013.01); *B60W 20/00* (2013.01); *B60W 50/0205* (2013.01); *B60W 50/0225* (2013.01); *B60W 20/50* (2013.01); *B60W 2510/081* (2013.01); *B60W 2710/083* (2013.01); *B60W 2710/085* (2013.01); *Y02T 10/7258* (2013.01)

(58) Field of Classification Search
CPC .. B60W 20/00; B60W 20/50; B60W 50/0205; B60W 50/0225; B60W 50/038; B60W 2510/081; B60W 2710/083; B60W 2710/085; Y02T 10/7258; B60L 3/0038
USPC ................................... 701/22, 67, 68; 73/862
See application file for complete search history.

(56) References Cited

U.S. PATENT DOCUMENTS

| | | | | |
|---|---|---|---|---|
| 4,621,327 A | * | 11/1986 | Dolph ................. | B62D 5/0463 180/446 |
| 5,295,415 A | * | 3/1994 | Abe ...................... | B60W 10/06 477/102 |
| 6,574,535 B1 | * | 6/2003 | Morris .................... | B60K 6/44 180/65.1 |
| 6,605,912 B1 | * | 8/2003 | Bharadwaj ............... | H02P 6/15 318/400.02 |

(Continued)

FOREIGN PATENT DOCUMENTS

IN  200902108  *  3/2010  .............. B60L 11/00

*Primary Examiner* — Michael McCullough
*Assistant Examiner* — Michael E Butler (57) ABSTRACT

A method for monitoring an electrically-powered torque machine configured to generate torque in a hybrid powertrain system includes monitoring signal outputs of a resolver configured to monitor rotational position of the torque machine. Upon detecting a fault warning state associated with the signal outputs of the resolver, a motor torque capacity of the torque machine is derated. Upon a clearing of the fault warning state, a torque ramp-up state to increase the motor torque capacity of the torque machine is executed. Notice of an incidence of a fault associated with the signal outputs of the resolver is provided only when the motor torque capacity fails to achieve a threshold motor torque capacity within a threshold recovery time period while executing the torque ramp-up state.

12 Claims, 4 Drawing Sheets

(56) References Cited

U.S. PATENT DOCUMENTS

| | | | | |
|---|---|---|---|---|
| 7,002,318 | B1* | 2/2006 | Schulz | B60L 3/0038 318/437 |
| 8,027,231 | B2* | 9/2011 | Oono | G11B 7/0946 369/30.12 |
| 2003/0078134 | A1* | 4/2003 | Kojima | B60K 6/365 477/3 |
| 2004/0013530 | A1* | 1/2004 | Kelly | F04B 49/06 417/32 |
| 2005/0080527 | A1* | 4/2005 | Tao | F16H 59/38 701/31.1 |
| 2008/0265662 | A1* | 10/2008 | Karnjate | B60T 7/06 180/65.27 |
| 2008/0272731 | A1* | 11/2008 | Schulz | H02P 21/06 318/807 |
| 2009/0066281 | A1* | 3/2009 | West | B60L 3/00 318/434 |
| 2009/0069964 | A1* | 3/2009 | Wyatt | B60L 3/00 701/22 |
| 2009/0125171 | A1* | 5/2009 | West | B60K 6/46 701/22 |
| 2010/0038158 | A1* | 2/2010 | Whitney | B60K 6/365 180/65.265 |
| 2010/0181949 | A1* | 7/2010 | Bates | H02P 3/12 318/400.09 |
| 2011/0043145 | A1* | 2/2011 | Wang | G01D 5/24476 318/400.04 |
| 2011/0181216 | A1* | 7/2011 | Bass | H02P 6/28 318/400.11 |
| 2012/0109431 | A1* | 5/2012 | Wang | B60L 3/0061 701/22 |

* cited by examiner

METHOD AND APPARATUS FOR MONITORING A RESOLVER IN A TORQUE MACHINE

TECHNICAL FIELD

This disclosure is related to powertrain systems employing electrically-powered torque machines to generate torque.

BACKGROUND

The statements in this section merely provide background information related to the present disclosure and may not constitute prior art.

Powertrain systems employ electrically-powered torque machines to generate tractive torque for propulsion. Known torque machines include multiphase electric motor/generators electrically coupled to energy storage devices via high-voltage electric buses and inverter modules. Torque machines may use resolvers to monitor rotational position and rotational speed, and use such information for control and operation thereof. Resolver faults may lead to non-optimum performance of the torque machine with poor torque control performance or a complete inability to control the motor. Resolver faults may lead to other motor failure modes, e.g., overcurrent states. Resolver faults may include intermittent faults that are difficult to diagnose and detect.

Known resolver faults include a loss of signal (LOS) fault, a degradation of signal (DOS) fault, and a loss of tracking (LOT) fault. Known resolver monitoring and diagnostic schemes include monitoring duration and quantity of indicated resolver faults, and monitoring motor torque output associated with a resolver fault. A resolver fault may be detected when duration and quantity of indicated faults exceeds a predetermined threshold, or when motor torque output is outside a predetermined window. Known resolver fault detection schemes include counting a quantity of indicated faults during a key-on cycle.

SUMMARY

A hybrid powertrain system includes an electrically-powered torque machine configured to generate torque. A method for monitoring the torque machine includes monitoring signal outputs of a resolver configured to monitor rotational position of the torque machine. Upon detecting a fault warning state associated with the signal outputs of the resolver, a motor torque capacity of the torque machine is derated. Upon a clearing of the fault warning state, a torque ramp-up state to increase the motor torque capacity of the torque machine is executed. Notice of an incidence of a fault associated with the signal outputs of the resolver is provided only when the motor torque capacity fails to achieve a threshold motor torque capacity within a threshold recovery time period while executing the torque ramp-up state.

BRIEF DESCRIPTION OF THE DRAWINGS

One or more embodiments will now be described, by way of example, with reference to the accompanying drawings, in which.

DETAILED DESCRIPTION

Figure 1:
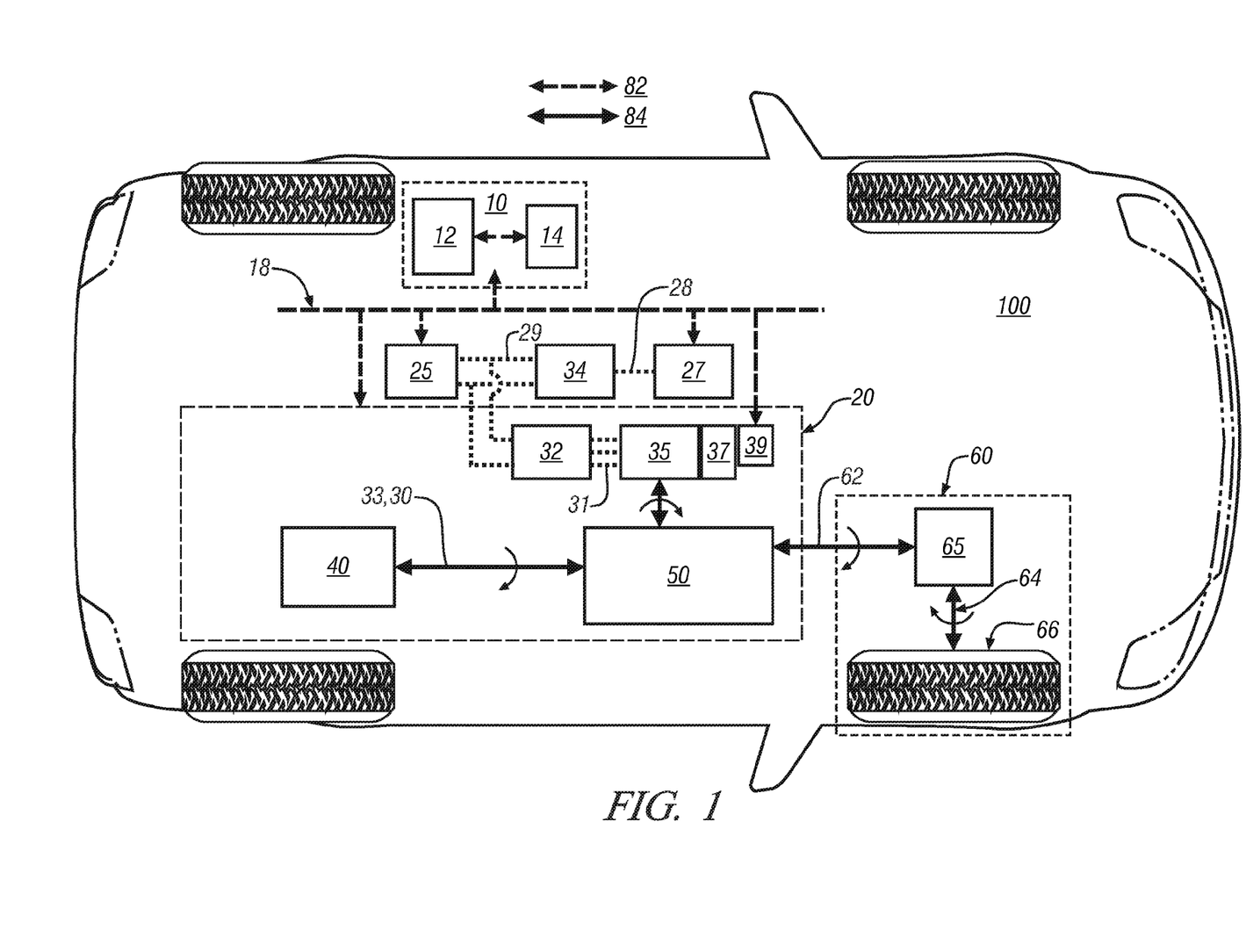
FIG. 1 schematically shows a vehicle including a hybrid powertrain system coupled to a driveline and controlled by a control system, in accordance with the disclosure.

Referring now to the drawings, wherein the showings are for the purpose of illustrating certain exemplary embodiments only and not for the purpose of limiting the same, FIG. 1 schematically shows a vehicle 100 including a hybrid powertrain system 20 coupled to a driveline 60 and controlled by a control system 10. Like numerals refer to like elements throughout the description.

The hybrid powertrain system 20 includes a mechanical power path 84 that includes an internal combustion engine 40 and an electrically-powered torque machine 35 that mechanically couple to a hybrid transmission 50 having an output member 62 that couples to the driveline 60. The mechanical power path 84 of the hybrid powertrain system 20 may include a series-type mechanical power path, a parallel-type mechanical power, a belt-alternator-starter mechanical power path, or any other suitable mechanical power path for transferring torque between the engine 40, the torque machine 35, the transmission 50 and the driveline 60.

The hybrid powertrain system 20 includes a communications path 82 including communications bus 18 to effect communications in the form of sensor signals and actuator command signals between the control system 10 and the elements of the hybrid powertrain system 20. It is appreciated that the communications path 82 effects information transfer to and from the control system 10 using one or more communications systems and devices, including, e.g., the communications bus 18, a direct connection, a local area network bus, a serial peripheral interface bus, and wireless communications.

High-voltage electric power may be provided by a high-voltage battery 25 that electrically connects to an inverter module 32 via a high-voltage DC bus 29. The inverter module 32 electrically connects to the torque machine 35 via power bus 31. In one embodiment, a DC/DC electric power converter 34 electrically connects to a low-voltage bus 28 and a low-voltage battery 27, and electrically connects to the high-voltage bus 29. Such electric power connections are known and not described in detail.

One hybrid powertrain system 20 includes the engine 40 as a multi-cylinder internal combustion engine that converts fuel to mechanical power through a combustion process. The engine 40 is equipped with a plurality of actuators and sensing devices for monitoring operation and delivering fuel to form a combustion charge to produce torque that is responsive to an operator torque request.

The electrically-powered torque machine 35 is preferably a multi-phase electric motor/generator configured to convert stored electric energy to mechanical power and convert mechanical power to electric energy that may be stored in the high-voltage battery 25. The torque machine 35 mechanically couples to one of the engine 40 and the transmission 50 in a suitable location to transfer torque therebetween. In one embodiment, the torque machine 35 mechanically couples to a torque-transfer element of the transmission 50. In one embodiment, the torque machine 35 mechanically couples to a torque-transfer element of the engine 40, e.g., a crankshaft, via a pulley and belt or other suitable connection.

The torque machine 35 includes a rotor and a stator and an accompanying resolver 37. The resolver 37 is a variable reluctance device including a resolver stator and a resolver rotor that are assembled onto the rotor and stator, respectively, of the torque machine 35. The resolver 37 preferably includes a signal decoder chip 39 that monitors signals output from the resolver 37 and calculates angular position and rotational speed of the resolver rotor. The angular position and rotational speed of the resolver rotor is used to monitor the angular position and rotational speed of the torque machine 35 in a manner suitable for controlling operation thereof, including controlling torque output.

The decoder chip 39 is configured to monitor rotational position and rotational speed of the rotor of the torque machine 35 in a manner suitable for controlling operation thereof. The decoder chip 39 is also configured to detect and communicate faults associated with its generated signal, including a loss of signal (LOS) fault, a degradation of signal (DOS) fault, and a loss of tracking (LOT) fault. An LOS fault may be detected when the resolver signal is less than a threshold signal. A DOS fault may be detected when the resolver signal is saturated or has excess noise. An LOT fault may be detected when the quality of the resolver signal does not permit operation of a phase-lock loop or other similar tracking strategy to monitor motor position. This may include operating the torque machine 35 at a rate of speed in excess of a threshold.

Resolver faults are associated with one or more of the LOS, DOS and LOT faults of the decoder chip 39. Resolver faults include a short-duration fault (SD Fault), a medium-duration fault (MD Fault), a long-duration fault (LD Fault), and a repeated medium-duration fault (RMD Fault). The different resolver faults are distinguishable based upon their duration relative to a predetermined period of time associated with motor control.

The inverter 32 is operative to transform high-voltage DC electric power to high-voltage AC electric power and is also operative to transform high-voltage AC electric power to high-voltage DC electric power. The inverter 32 preferably employs pulsewidth-modulating control to convert stored DC electric power originating in the high-voltage battery 25 to AC electric power to drive the torque machine 35 to generate tractive torque. Similarly, the inverter 32 converts mechanical power in the torque machine 35 to DC electric power that is storable in the high-voltage battery 25 as part of a regenerative control strategy. It is appreciated that the inverter 32 is configured to receive motor control commands and control inverter states to provide the motor drive and regeneration functionality.

The transmission 50 preferably includes one or more differential gear sets and activatable clutch components to effect torque transfer over a range of speeds between the engine 40, the torque machine 35, and the output member 62. The transmission 50 includes any suitable configuration, including being operative in fixed-gear and continuously variable operating modes to transfer torque.

The driveline 60 may include a differential gear device 65 that mechanically couples to an axle 64 or half-shaft that mechanically couples to a wheel 66 in one embodiment. The driveline 60 transfers tractive power between the hybrid transmission 50 and a road surface. It is appreciated that the hybrid powertrain system 20 is illustrative and not limiting.

The control system 10 includes a control module 12 that is signally connected to an operator interface 14. The control module 12 preferably signally and operatively connects to individual elements of the hybrid powertrain system 20 either directly or via the communications bus 18. The control module 12 signally connects to the sensing devices of each of the high-voltage battery 25, the inverter module 32, the torque machine 35, the engine 40, and the hybrid transmission 50 to monitor operation and determine parametric states thereof.

The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal, a brake pedal, a transmission range selector (PRNDL), a steering wheel, and a headlamp switch.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
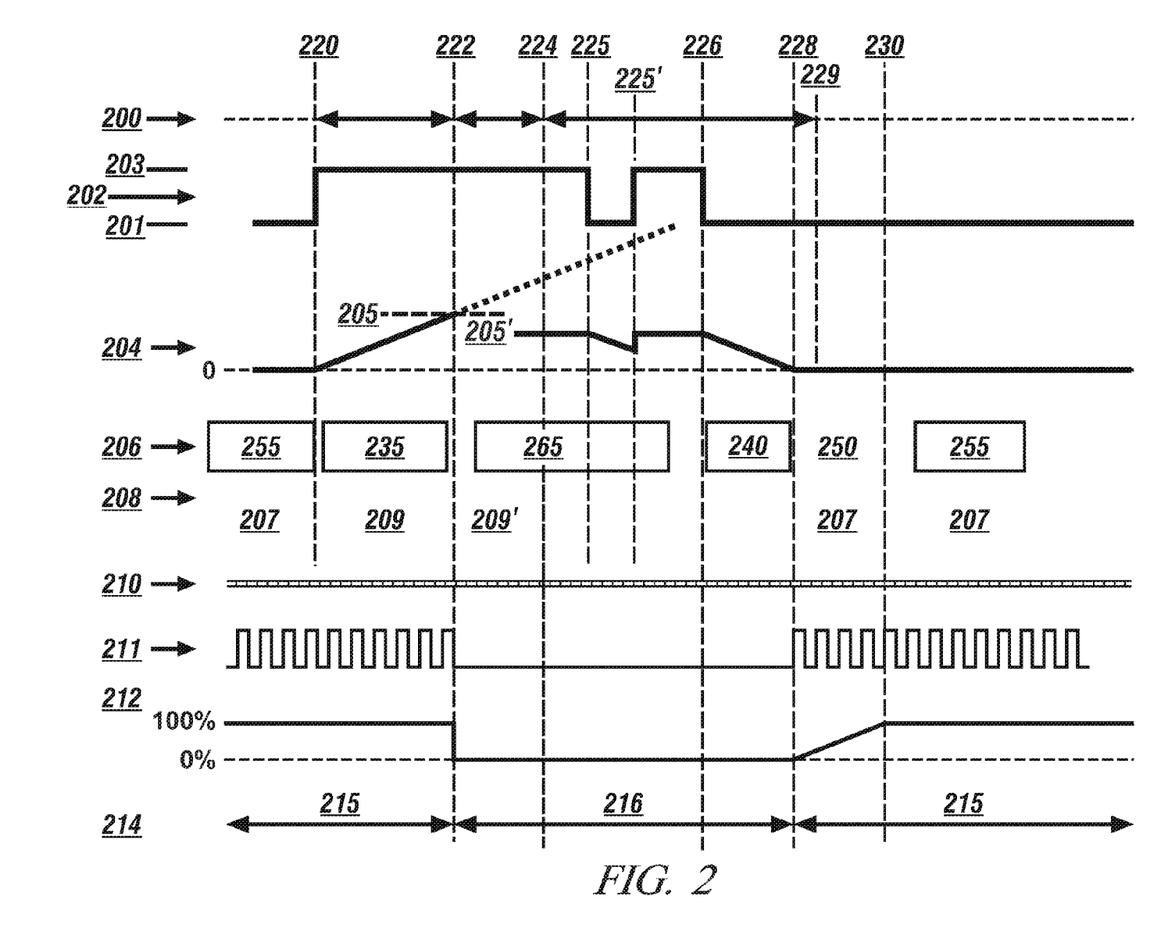
FIG. 2 is a datagraph showing a plurality of time-coincident signals associated with controlling operation of a torque machine including signals associated with monitoring operation of a resolver, in accordance with the disclosure.

FIG. 2 is a datagraph that graphically shows a plurality of time-coincident signals associated with controlling operation of the torque machine 35 including signals associated with monitoring operation of the resolver 37, preferably using signals output from the decoder chip 39. The signals include a resolver state 202, a fault counter 204, a motor control state 206, a rotor position determination function 208, a motor command state 210, a motor control state 211, a motor torque capacity 212, and an angular position validity state 214. Elapsed times are indicated on timeline 200.

Initially, i.e., prior to time point T0 220, the resolver state 202 is a no-fault state 201, indicating normal operation and absence of a fault. As such the fault counter 204 is zero, the motor control state 206 indicates the resolver 37 is operating as intended, i.e., in a good state 255, the rotor position determination function 208 is a first state 207 wherein the rotor position is determined using data from the resolver 37, the motor command state 210 indicates the torque machine 35 is controllable to generate torque, the motor control state 211 is a pulsewidth-modulated control signal corresponding to commanded motor torque, the motor torque capacity 212 is unrestricted, i.e., is at 100%, and the angular position validity state 214 is valid 215, indicating that the angular position output from the resolver 37 is valid, and thus the angular position of the torque machine 35 is valid and useable for control purposes.

A fault output by the resolver 37 causes the resolver fault state 202 to shift from the no-fault state 201 to a fault warning state 203 at time T0 220. As such the fault counter 204 begins to increment and an associated caution state 235 is indicated by the motor control state 206. During operation in the caution state 235, the rotor position determination function 208 is in a second state 209 wherein the rotor position may initially be determined by extrapolating the rotor position using previously captured data from the resolver 37. The motor command state 210 continues to indicate the torque machine 35 is controllable to generate torque. The motor control state 211 continues with the pulsewidth-modulated control signal corresponding to the commanded motor torque and with the motor torque capacity 212 unrestricted, i.e., at 100%. The angular position validity state 214 is valid 215, indicating that the angular position output from the resolver 37 is still considered valid. This initial period subsequent to indication of the resolver state 202 in the fault warning state 203 is referred to as an initial coast period, and continues until the fault counter 204 reaches a predetermined upcount numeral 205, which indicates an uninterrupted period of time wherein the resolver state 202 is shifted to the fault warning state 203. The initial coast period is associated with a capability to accurately extrapolate the angular position of the torque machine 35 for control purposes, and may be an order of magnitude of 20 msec in one embodiment.

When the resolver state 202 is shifted to the fault warning state 203 for an elapsed period of time that exceeds a threshold, as indicated by the resolver state 202 at the fault warning state 203 from time T0 220 to time T1 222, the torque machine 35 is shut down and electric power flow thereto is discontinued. The fault counter 204 may continue incrementing, or may discontinue incrementing. The motor control state 206 indicates a warning state 265. The rotor position determination function 208 is in a second portion of the second state 209' wherein the rotor position may no longer be determined by extrapolating the rotor position, and thus rotor position is no longer available or is invalid. The motor command state 210 continues to indicate the torque machine 35 is controllable. The motor control state 211 discontinues the pulsewidth-modulated control signal, i.e., is at a PWM signal of 0%. The motor torque capacity 212 is set to 0%, which indicates that the power output of the torque machine 35 is now derated. The angular position validity state 214 is invalid 216, indicating that the angular position output from the resolver 37 is invalid, and thus the angular position of the torque machine 35 is invalid and not useable for control purposes.

Beginning at T1 222, coincident with the fault counter 204 achieving a state indicating the resolver state 202 has shifted to the fault warning state 203 for an elapsed period of time that exceeds a threshold, the operating system engages in a retry period. During the retry period, the resolver state 202 is continually monitored to detect whether a fault has cleared. There is a minimum period of time, indicated between T1 222 and T2 224, during which the electric motor is derated to a motor torque capacity 212 of 0% and motor control actions are suspended prior to executing a retry.

The detected fault may subsequently clear, as indicated at time point 225. The resolver state 202 shifts from the fault warning state 203 to the no-fault state 201. The fault counter 204 begins to decrement, starting at a predetermined downcount numeral 205'. In one embodiment, the upcount numeral 205 is greater than the downcount numeral 205'. This operation is shown as being interrupted by occurrence of another resolver fault, indicated by the resolver fault 202 shifting to the fault warning state 203 at time point 225'.

The detected fault clears again at time point 226. A recovery state 240 is indicated when the resolver state 202 shifts from the fault warning state 203 to the no-fault state 201. The fault counter 204 begins to decrement, starting again at the predetermined downcount numeral 205'. The motor control state 206 indicates a shift to the recovery state 240, but operation of the torque machine 35 does not change during the recovery state 240. The recovery state 240 is identified as that period of time associated with decrementing the fault counter 204 from the predetermined downcount numeral 205' to zero. One exemplary complete recovery state 240 is indicated between time point 226 and time point 228.

The recovery state 240 ends at time point T3 228 when the fault counter 204 decrements to zero. A torque ramp-up state 250 begins when the fault counter 204 decrements to zero. The indication of the torque ramp-up state 250 is a signal to the control system that the torque machine 35 may be controllable to generate torque, although the torque capacity of the torque machine 35 continues to be derated. The torque capacity of the torque machine 35 is controlled with the torque capacity derated and monotonically increased over time in a ramp-up fashion. This includes restricting the motor torque capacity 212 by limiting or restricting the torque output from the torque machine 35 at a rate of torque increase from 0% to 100% over an elapsed period of time. As such, the power output of the torque machine 35 continues to be derated during the torque ramp-up state 250 to effect a smooth torque transition without a sudden bump or abrupt change in the motor torque.

At time point T3 228, the fault counter 204 is zero, the motor control state 206 indicates beginning of the torque ramp-up state 250, the rotor position determination function 208 is in the first state 207 wherein the rotor position is determined using data from the resolver 37, the motor command state 210 indicates the torque machine 35 is controllable to generate torque, albeit limited by the derated motor torque capacity 212, and the motor control state 211 is a pulsewidth-modulated control signal corresponding to a commanded motor torque that is limited by the derated motor torque capacity 212. The angular position validity state 214 is valid 215, indicating that the angular position output from the resolver 37 is valid, and thus the angular position of the torque machine 35 is valid and useable for control purposes.

At time point T5 230, the motor torque capacity 212 has increased to 100%, and the torque capacity from the torque machine 35 is no longer derated. The motor control state 206 is the good state 255, the rotor position determination function 208 is achieved using data from the resolver 37, the motor command state 210 indicates the torque machine 35 is controllable to generate torque in an unrestricted manner, and the motor control state 211 is a pulsewidth-modulated control signal corresponding to a commanded motor torque. The angular position validity state 214 is valid 215. By way of definition, the resolver faults including the short-duration fault (SD Fault), the medium-duration fault (MD Fault), the long-duration fault (LD Fault), and the repeated medium-duration fault (RMD Fault) are distinguishable based upon their duration relative to a predetermined period of time associated with motor control. An exemplary fault duration is shown with reference to FIG. 2 when the resolver state 202 toggles from the no-fault state 201 to the fault warning state 203 and subsequently back to the no-fault state 201, e.g., as shown between time point 220 and time point 225. An SD fault is identified when the fault duration is less time than the caution state 235. The rotor speed remains substantially unchanged during an SD fault. In one embodiment, an SD fault and associated caution state 235 have elapsed times of less than 10 msec. An MD fault is identified when the fault duration is longer than the caution state 235 but less than a predetermined allowable retry period, which may be in a range between 10 msec and 200 msec. An RMD Fault is identified when there are repeated MD faults. An LD Fault is identified when the fault duration is longer than the predetermined allowable retry period.

Figure 3:
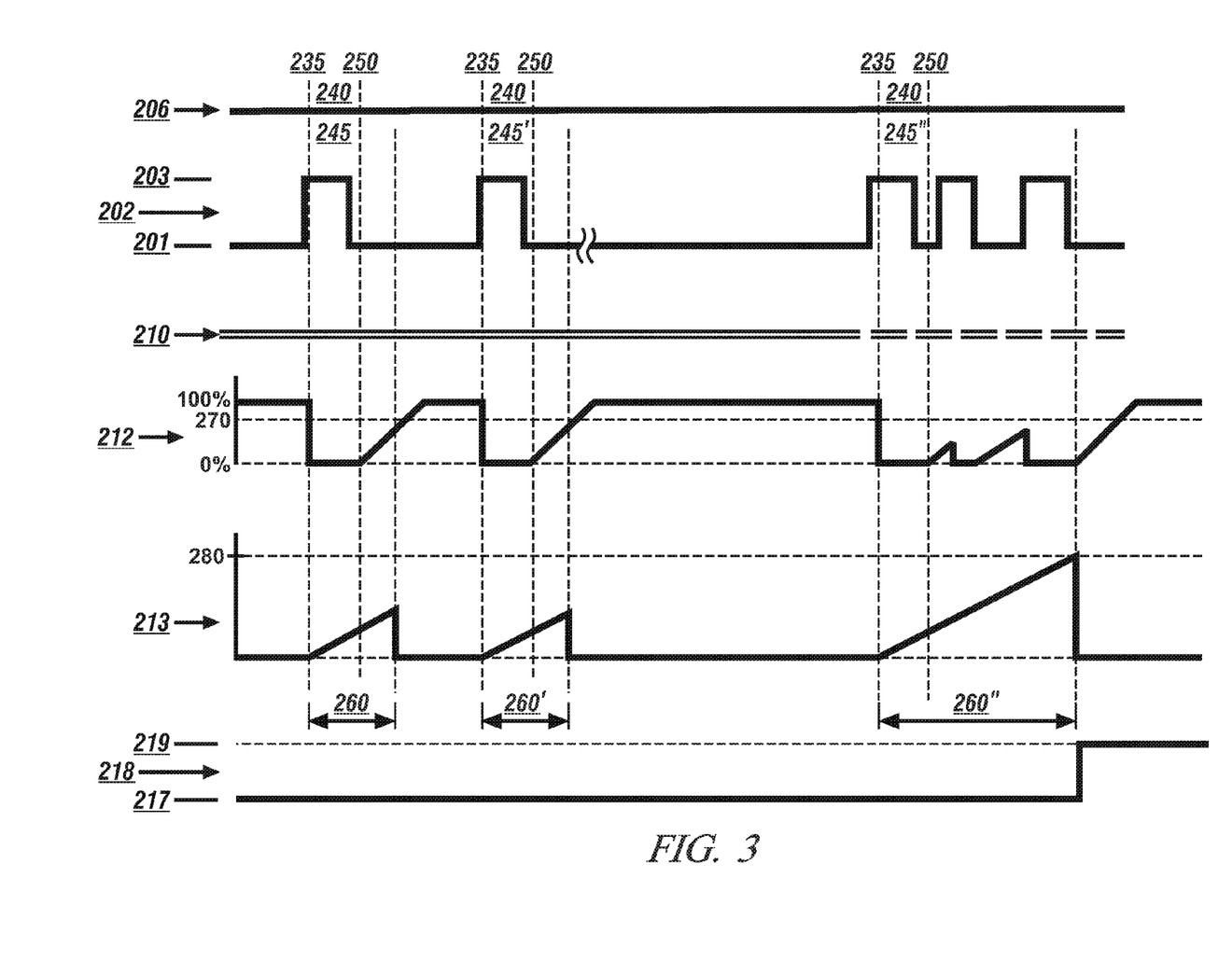
FIG. 3 is a datagraph showing a plurality of time-coincident signals associated with controlling operation of a torque machine and depicting motor speed control states indicating recovery states and subsequent torque ramp-up states associated with detected resolver faults, in accordance with the disclosure.

FIG. 3 is a datagraph 300 that graphically shows a plurality of time-coincident signals associated with controlling operation of the torque machine 35. The datagraph 300 depicts a series of the motor speed states 206 indicating the previously described caution states 235, recovery states 240 and subsequent torque ramp-up states 250 associated with resolver fault warnings indicated by the resolver state 202 shifting between the no-fault state 201 and the fault warning state 203. The corresponding motor torque capacity 212 is shown, ranging from 0% to 100%, and including a torque threshold 270, which is a calibratable torque value. A torque loss timer 213 operates to measure an elapsed period of time associated with derating the motor torque. As shown, the torque loss timer 213 measures an elapsed period of time starting when the motor torque capacity 212 is derated, i.e., commanded to 0% until the motor torque capacity 212 exceeds a predetermined torque threshold 270. In context of the operation described with reference to FIG. 2, the elapsed period of time that starts when the motor torque capacity 212 is derated corresponds to the start of the recovery state 240 and ends when the derated motor torque capacity 212 exceeds the torque threshold 270 during a subsequent torque ramp-up state 250. The datagraph depicts recovery time periods 260, 260' and 260". The recovery time period 260 indicates a period of time during which the motor torque capacity 212 is derated. A malfunction indicator lamp (MIL) state is either OFF 217 or ON 219. When the recovery time period 260 is less than a predetermined threshold, no fault is indicated, i.e., the MIL state is OFF 217. When the recovery time period 260 exceeds the predetermined time threshold, a fault is indicated, i.e., the MIL state in ON 219.

As shown, a first fault incident 245 follows a first caution state 235 and includes a single recovery state 240 and subsequent torque ramp-up state 250 associated with a resolver fault warning state 203. As indicated the motor torque capacity 212 exceeds the torque threshold 270 at the recovery time period 260. The MIL state is OFF 217.

A second fault incident 245' includes another caution state 235 and single recovery state 240 and subsequent single ramp-up period 250 associated with a resolver fault warning state 203. As indicated the motor torque capacity 212 exceeds the torque threshold 270 after the second recovery time period 260'. The MIL state is OFF 217.

A third fault incident 245" includes a caution state 235 followed by a plurality of recovery periods 240 and corresponding plurality of subsequent ramp-up periods 250 associated with a plurality of resolver fault warning states 203. As indicated the motor torque capacity 212 exceeds the torque threshold 270 only after the third recovery time period 260", wherein the third recovery time period 260" exceeds a threshold recovery time period. The MIL state switches to ON 219. The threshold recovery time period is a calibratable value that is determined based upon a time and magnitude of derated motor torque that is discernible by a vehicle operator.

Figure 4:
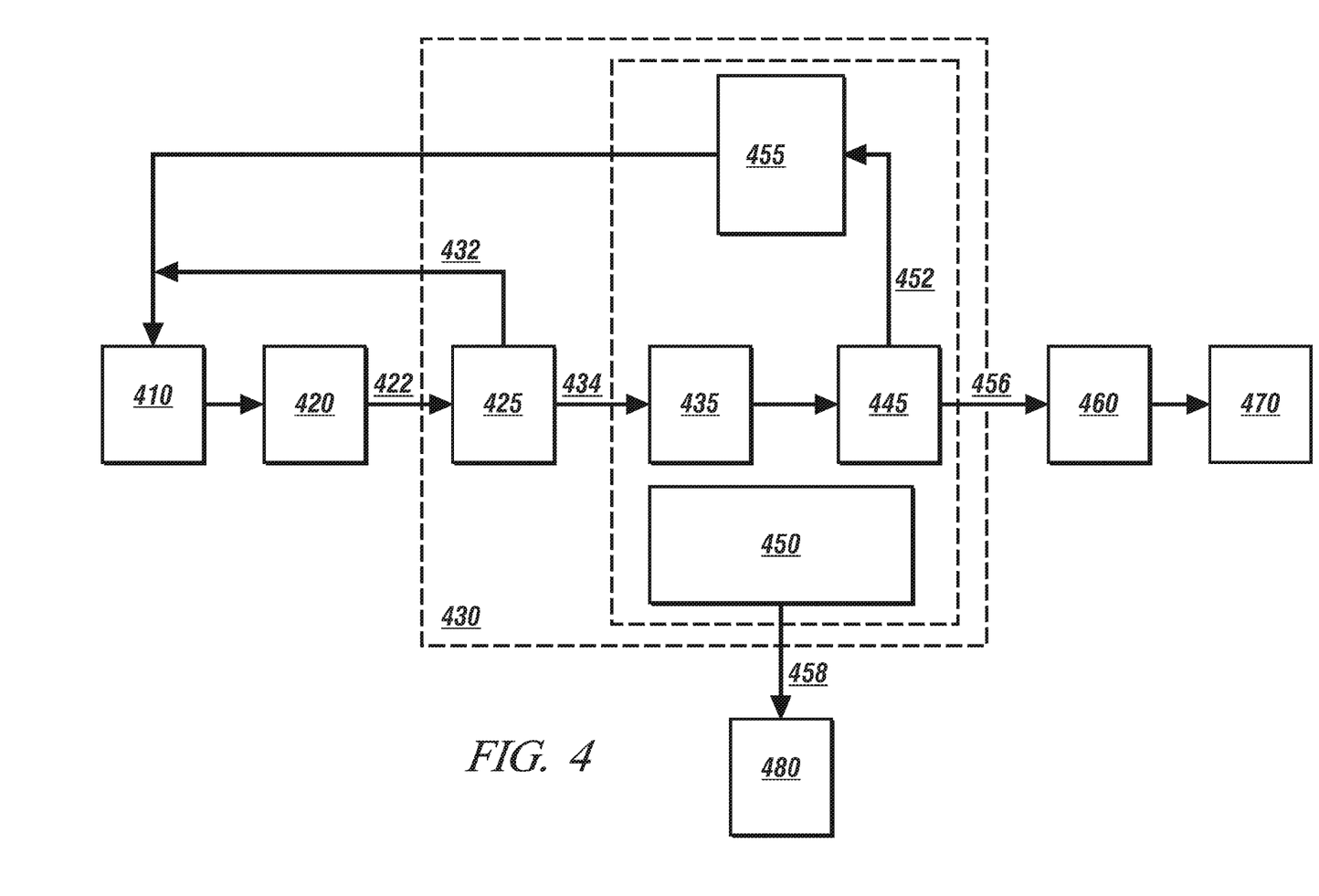
FIG. 4 schematically shows a control scheme in the form of a flowchart for monitoring operation of the torque machine that includes detection of faults associated with operation of the resolver during ongoing powertrain operation, in accordance with the disclosure.

FIG. 4 shows a control scheme in the form of a flowchart for monitoring operation of the torque machine 35 that includes detection of faults associated with operation of the resolver 37 during ongoing powertrain operation. The flowchart is periodically executed in a control module of the powertrain system, preferably during one of the loop cycles. The control scheme monitors occurrence of resolver faults, with a goal of identifying repeated medium-duration faults (RMD Fault) in a manner that permits repeated retry periods after a resolver fault clears, including repeated recovery states 240 and torque ramp-up states 250. This permits ongoing operation of the powertrain and notification to an operator of a resolver fault while minimizing likelihood of prematurely commanding a shutdown of the torque machine 35. The fault detection takes into account an elapsed time (duration) and a magnitude of derated torque capacity output from the torque machine 35, with thresholds that may be associated with a change in torque output that is discernible by a vehicle operator. The control scheme is described with reference to elements and parameters previously described in FIGS. 1, 2, and 3.

Table 1 is provided as a key to the flowchart of FIG. 4 wherein the numerically labeled blocks and the corresponding functions are set forth as follows.

TABLE 1

| BLOCK | BLOCK CONTENTS |
| --- | --- |
| | FIG. 4 |
| 410 | Operate torque machine in good state |
| 420 | Monitor resolver fault status |
| 422 | Fault warning indicated |
| 430 | Evaluate fault warning |
| 425 | Execute caution state |
| 432 | Execute resolver recovery |
| 434 | Coasting time expires |
| 435 | Derate motor torque capacity |
| 445 | Execute recovery state |
| 450 | Check torque capacity derate % |
| | Check torque capacity derate duration |
| 452 | Recovery period achieved |
| 455 | Execute torque ramp-up state |
| 456 | Total retry time expires |
| 458 | Duration of torque capacity derate % exceeds calibration |
| 460 | Long duration fault matures |
| 470 | Shut down torque machine; Illuminate MIL |
| 480 | Medium duration fault matures; Illuminate MIL |

A control scheme operates the torque machine in the good state during ongoing powertrain operation (410) including monitoring fault status of the resolver (420).

When a fault warning associated with the resolver is indicated (422), the fault warning is evaluated (430). This includes identifying whether the indicated fault is a short-duration fault (SD Fault), a medium-duration fault (MD Fault), a long-duration fault (LD Fault), or a repeated medium-duration fault (RMD Fault). The different resolver faults are distinguishable based upon their duration relative to a predetermined period of time associated with motor control, as previously discussed. As is appreciated, any of the aforementioned types of resolver faults, i.e., LOS, DOS, and LOT may lead to a fault warning.

A caution state is executed (425), allowing for fault debouncing before executing further actions that affect torque output of the machine. As described with reference to FIG. 2, during operation in the caution state 235, the rotor position determination function 208 determines the rotor position by extrapolating the rotor position using previously captured data from the resolver 37 and the motor command state 210 continues to indicate the torque machine 35 is controllable to generate torque. During the caution state, if the fault warning associated with the resolver clears, resolver recovery is executed (432), and the torque machine returns to operating in the good state (410). This operation is generally associated with detection and resolution of a short-duration fault (SD Fault).

If a predetermined coasting time expires while operating in the caution state (434), the motor torque capacity is derated (435), and a recovery state is executed (445). The recovery state is the previously described recovery state 240, which is identified as that period of time starting when a resolver fault clears until a fault counter decrements to zero. It is appreciated that the recovery state allows for signal and fault debouncing.

When the recovery state completes successfully (452), a torque ramp-up state is executed (455). The torque ramp-up state includes increasing the torque capacity of the torque machine, as previously described, including monotonically increasing motor torque over time in a ramp-up fashion. When the torque ramp-up state is successfully completed, the torque machine returns to operating in the good state (410). This operation is generally associated with detection and resolution of a single medium-duration fault (MD Fault).

The process of derating the motor torque (435) and executing the recovery state (445) and the torque ramp-up state (455) may be an iterative process during which medium-duration faults may repeatedly occurred, referred to as repeated medium-duration faults (RMD Fault). This includes monitoring the derated torque capacity and an associated derated torque capacity timer when there is an indication that a recovery state has started (450).

Monitoring the derated torque capacity and the associated derated torque capacity timer provides a time measurement of the recovery time period 260 described with reference to FIG. 3, i.e., the period of time during which the motor torque capacity is derated and the torque machine operates below a predetermined torque threshold.

When the derated torque capacity exceeds the predetermined torque threshold and the derated torque capacity timer is less than a predetermined threshold, it is an indication that the fault has cleared in a suitable period of time, and operation of the torque machine continues.

When the derated torque capacity has not exceeded the predetermined torque threshold and the derated torque capacity timer has not exceeded the predetermined torque threshold, monitoring of the resolver continues as described. The motor torque capacity continues to be derated, but there is no command to notify the operator.

When the derated torque capacity has exceeded the predetermined torque threshold but only after the torque loss timer exceeds the predetermined threshold, a command is sent to notify the vehicle operator by illuminating the MIL (480). Operation of the powertrain system may continue, including executing subsequent retry events.

When the derated torque capacity has not exceeded the predetermined torque threshold and the derated torque capacity timer has exceeded the threshold, the command is sent to notify the vehicle operator by illuminating the MIL (480). This is how repeated medium-duration faults (RMD Fault) are detected.

When a total retry time period expires without successfully completing a recovery state (456), it is an indication of presence of a matured long-duration fault (460). The torque machine is shut down and a malfunction indicator lamp (MIL) is illuminated to notify the operator of the fault. Operation of the powertrain system may continue without contribution from the torque machine on systems having such capability.

The control scheme described herein permits a resolver fault to mature based upon factors including a duration of torque capacity derate event, which includes a magnitude of torque derate caused by the resolver fault and a duration of the torque derate event. The selection of these two calibration terms are based on vehicle driving experiences when a resolver is having repeated mid-duration faults. It is appreciated that this control scheme is executed in a manner to minimize shutdown of the torque machine 35 and instead allows commanding MIL illumination only after a fault has matured.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring an electrically-powered torque machine configured to generate torque in a hybrid powertrain system, comprising:
monitoring signal outputs of a resolver configured to monitor rotational position of the torque machine;
upon detecting a fault warning state associated with the signal outputs of the resolver, derating a motor torque capacity of the torque machine;
upon a clearing of the fault warning state, executing a torque ramp-up state to increase the motor torque capacity of the torque machine;
monitoring a torque loss timer output indicating a duration of a time period, beginning at the time the motor torque capacity is derated, in which the derated motor torque capacity of the torque machine is less than a threshold motor torque capacity;
determining whether a recovery time period, comprising the monitored time period during which the derated motor torque capacity of the torque machine is less than the threshold motor torque capacity, exceeds a threshold recovery time period, defining a maximum desired period of time for the torque machine to operate at less than the threshold motor torque capacity;
when the recovery time period is determined not to exceed the threshold recovery time period operating a malfunction indicator lamp in an OFF state; and
when the recovery time period is determined to exceed the threshold recovery time period providing notice of an incidence of repeated medium-duration faults associated with the signal outputs of the resolver, said notice of an incidence of repeated medium-duration faults comprising operating the malfunction indicator lamp in an ON state.

2. The method of claim 1, wherein the notice of the incidence of a fault associated with the signal outputs of the resolver is provided subsequent to detecting the fault warning state.

3. The method of claim 1, wherein derating the motor torque capacity of the torque machine comprises setting the motor torque capacity to 0%.

4. The method of claim 1, wherein executing the torque ramp-up state to increase the motor torque capacity of the torque machine comprises monotonically increasing the motor torque capacity from 0% to 100% subsequent to clearing the fault warning state.

5. The method of claim 1, wherein detecting a fault incident associated with the signal outputs of the resolver comprises detecting one of a loss of signal fault, a degradation of signal fault, and a loss of tracking fault.

6. The method of claim 1, wherein detecting a fault incident associated with the signal outputs of the resolver comprises detecting a repeated medium-duration fault.

7. The method of claim 1, further comprising executing a recovery state prior to executing the torque ramp-up state upon the clearing of the fault warning state.

8. The method of claim 7, wherein executing the recovery state comprises setting the motor torque capacity to 0% for a period of time prior to the executing the torque ramp-up state.

9. Method for controlling an electrically-powered torque machine configured to generate tractive torque in a hybrid powertrain system, comprising:
   monitoring signal outputs of a resolver configured to monitor rotational position of the torque machine;
   upon detecting a fault warning state associated with the signal outputs of the resolver, derating motor torque capacity of the torque machine to a motor torque capacity of 0%;
   upon a clearing of the fault warning state, executing a torque ramp-up of the derated motor torque capacity; and
   limiting torque output of the torque machine based upon the derated motor torque capacity;
   monitoring a torque loss timer output indicating a duration of a time period, beginning at the time the motor torque capacity is derated, in which the derated motor torque capacity of the torque machine is less than a threshold motor torque capacity;
   determining whether a recovery time period, comprising the monitored time period during which the derated motor torque capacity of the torque machine is less than the threshold motor torque capacity, exceeds a threshold recovery time period, defining a maximum desired period of time for the torque machine to operate at less than the threshold motor torque capacity;
   when the recovery time period is determined not to exceed the threshold recovery time period operating a malfunction indicator lamp in an OFF state; and
   when the recovery time period is determined to exceed the threshold recovery time period providing notice of an incidence of repeated medium-duration faults associated with the signal outputs of the resolver, said notice of an incidence of repeated medium-duration faults comprising operating the malfunction indicator lamp in an ON state.

10. The method of claim 9, wherein executing the torque ramp-up of the derated motor torque capacity comprises monotonically increasing the motor torque capacity from 0% to 100% subsequent to clearing the fault warning state.

11. Method for monitoring an electrically-powered torque machine configured to generate torque in a hybrid powertrain system, comprising:
   detecting a fault warning state associated with signal outputs from a resolver configured to monitor rotational position of the torque machine;
   derating motor torque capacity of the torque machine upon detecting the fault warning state;
   detecting the fault warning state has cleared;
   executing a recovery state;
   executing a torque ramp-up state upon completing the recovery state; and
   monitoring a torque loss timer output indicating a duration of a time period, beginning at the time the motor torque capacity is derated, in which the derated motor torque capacity of the torque machine is less than a predetermined threshold motor torque capacity;
   determining whether a recovery time period, comprising the monitored time period during which the derated motor torque capacity of the torque machine is less than the predetermined threshold motor torque capacity, exceeds the predetermined recovery time period, defining a maximum desired period of time for the torque machine to operate at less than the predetermined motor torque capacity, while executing the torque ramp-up state;
   maintaining operation of the torque machine and operating a malfunction indicator lamp in an OFF state when the derated motor torque capacity achieves a predetermined threshold motor torque capacity within a predetermined recovery time period while executing the recovery state and the torque ramp-up state;
   providing notice of an incidence of repeated medium-duration faults associated with the signal outputs of the resolver when the derated motor torque capacity does not achieve the predetermined threshold motor torque capacity within a predetermined recovery time period while executing the recovery state and the torque ramp-up state, said notice of an incidence of repeated medium-duration faults comprising operating the malfunction indicator lamp in an ON state.

12. The method of claim 11, wherein executing the torque ramp-up state upon completing the recovery state comprises monotonically ramping-up the derated motor torque capacity.

* * * * *